United States Patent

Hlady et al.

[15] 3,653,031

[45] Mar. 28, 1972

[54] TOUCH-SENSITIVE POSITION ENCODER

[72] Inventors: Alvin M. Hlady; William C. Brown; John W. Brahan, all of Ottawa, Canada

[73] Assignee: Canadian Patents and Development Limited, Ottawa, Ontario, Canada

[22] Filed: May 25, 1970

[21] Appl. No.: 39,986

[30] Foreign Application Priority Data

June 13, 1969 Canada .....................................54287

[52] U.S. Cl. .....................340/347 AD, 340/16, 343/112 PT

[51] Int. Cl. .........................................................H03k 13/02

[58] Field of Search ..................340/347, 16; 178/18, 19, 20; 343/112 PT

[56] References Cited

UNITED STATES PATENTS

| | | | |
|---|---|---|---|
| 3,439,316 | 4/1969 | Miller | 340/347 |
| 3,134,099 | 5/1964 | Woo | 340/347 |
| 3,156,766 | 11/1964 | Stamps | 340/16 |
| 3,504,334 | 3/1970 | Twinage | 340/16 |

*Primary Examiner*—Thomas A. Robinson
*Assistant Examiner*—Jeremiah Glassman
*Attorney*—James R. Hughes

[57] ABSTRACT

A touch-sensitive position encoder for computer input in which transducers for the propagation and reception of elastic surface waves are positioned at the edges of a sheet of transparent material preferably glass. A finger or stylus placed at a position on the sheet will reflect the surface waves. Detecting and timing circuitry connected to the transducers determine the position of the finger or stylus in geometrical co-ordinate terms.

9 Claims, 4 Drawing Figures

Figure 1:
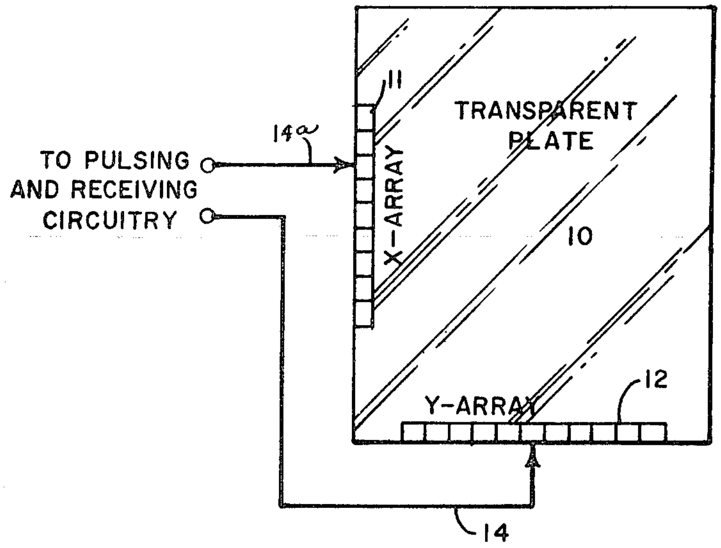

INVENTORS
ALVIN M. HLADY
WILLIAM C. BROWN
JOHN W. BRAHAN
BY J. R. Hughes
AGENT

INVENTORS
ALVIN M. HLADY
WILLIAM C. BROWN
JOHN W. BRAHAN
BY J. R. Hughes
AGENT

TOUCH-SENSITIVE POSITION ENCODER

This invention relates to a computer input device and more particularly to a touch-sensitive position encoder for computer input.

Any input device used in conjunction with a computer controlled display for interactive information exchange between man and computer must function as a position encoder. The major considerations in developing a computer input device to handle two dimensional positional information are the location of the input surface with respect to the display and the mechanism by which a user indicates selected positions on the input surface.

In order to use the input and display interactively, there must be a direct mapping of positions from one surface to the other. For the human user, this relationship is simplified considerably if the two surfaces are coincident. This assumes a one to one mapping scale. If the input surface is superimposed on the display surface but with finite separation, the user has to cope with the problem of parallax. This arrangement and the previous one require a transparent input surface. The third possibility is that the two surfaces are in different physical locations making it necessary for the user to condition his metal processes accordingly. The accuracy with which one can relate positions on the two surfaces is significant when the device is being used for item selection, that is, for the selection of a sub-set from a set of items shown on the display surface. If the surface separation is large, the user must rely on a visual feedback process by observing the mapping of his selected position in relation to the desired item or position and modifying his selection to decrease the difference. The time and mental effort required to do this may be significant in many instances.

The second major factor is the actual method of indicating positions. The approach used in one class of input devices eliminates the input surface and depends entirely on visual feedback from the display surface. Position selection is accomplished by manually controlling a lever or other device that is movable in two directions. Another common method is the use of a hand held active stylus on an associated plate or tablet. An active stylus is one which contains a signal sensor, or in some cases, a signal radiator. An electrical cable must normally connect the stylus to the system, and in addition, the stylus must be large enough to accommodate the necessary components. This makes active styli difficult to use with any sort of dexterity. An example of an encoder using an active stylus in conjunction with ultrasonic surface waves on a glass sheet is described in U.S. Pat. No. 3,134,099 issued to P. W. Woo on May 19, 1964.

It is an object of the present invention to provide a position encoder for use with a computer that responds to the positioning of a passive element for example a finger, a stylus, a pencil, or any suitable pointing device on a display tablet.

It is another object of the invention to provide a position encoder for use with a computer that may be completely transparent and that may be placed over any displayed information presented on cathode ray tube screens, projection screens, opaque mediums, or other forms of display.

It is another object of the invention to provide a position encoder that will provide intimate and intuitive interaction between human operator and the data presenting and response assessing computer, most particularly an encoder that will be ideal for use by young students communicating with a computer assisted instruction system.

These and other objects of the invention are achieved by a computer input device using echo ranging techniques which provides the position co-ordinates of the location at which a human finger or passive stylus makes contact with the surface of a transparent glass plate comprising an extensive, transparent sheet, a first transducer positioned at a first position on an edge of said sheet, a second transducer positioned at a second position on an edge of said sheet a pulsed source of energy connected to said transducers for generating surface waves on said sheet, and receiver and timing means connected to said transducers for detecting and timing reflected energy pulses such that the position of the finger or a stylus placed on the sheet and causing reflections will be determined in co-ordinate terms.

In a preferred version of the invention the apparatus provides the *x–y* co-ordinates of the location at which a human finger or passive stylus makes contact with the surface of a transparent sheet and the transducers are in the form of a first linear transducer array positioned along one edge of the transparent sheet and a second linear transducer array positioned along a second edge of said sheet orthogonal to the first.

In another version of the invention the apparatus includes transducer arrays along all edges of the transparent sheet.

Figure 2:
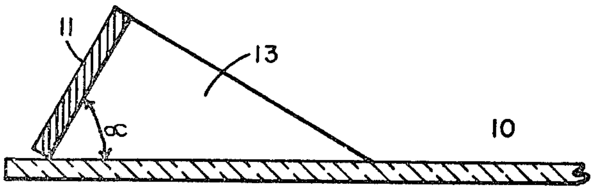
Figure 3:
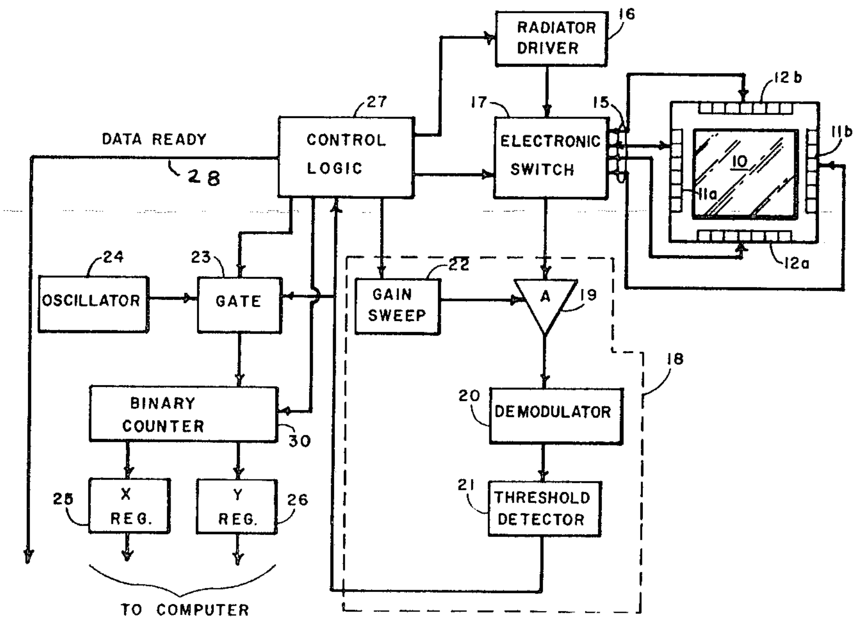
Figure 4:
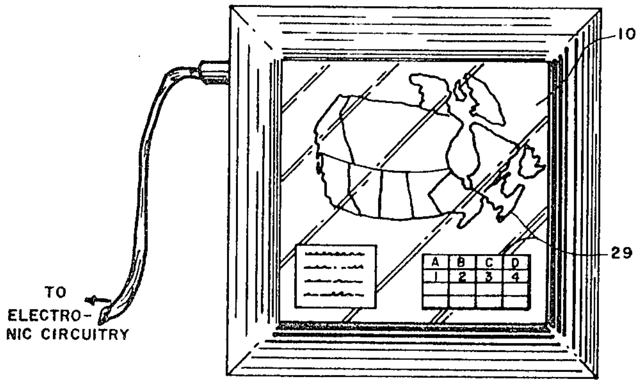

In drawings which illustrate an embodiment of the invention,

FIG. 1 is a transparent plate or tablet showing positioning of transducer arrays, FIG. 2 shows a preferred form of mounting of the transducers, FIG. 3 is a block diagram of a complete encoder showing radiating, receiving and timing circuitry, and FIG. 4 is the encoder tablet or sheet in position over typical educational question-and-answer data.

Referring to FIG. 1, a transparent glass sheet 10 has an *x*-array of piezoelectric transducers 11 mounted along one edge and an *y*-array 12 mounted along a second edge at right angles to the first. Transparency of plate 10 is an important feature since it allows undistorted, natural viewing of any material displayed behind it and permits the entry of information by coincident mapping onto the input surface. In an actual device built and tested the plate size was chosen to provide a usable working surface of 10 × 10 inches. The transducer arrays 11 and 12 are made up of transducer elements **11*e* and 12*e* and these are mounted as shown in more detail in FIG. 2 and are typically of lead zirconate-lead titanite ceramic having a thickness mode electromechanical coupling coefficient of 0.66. This material has been found to give good energy transformation both as radiators and sensors. The transducers are bonded directly to prisms 13 which in turn are bonded directly to the surface of the glass plate 10**. A series of transducers are arranged along each edge to form an array that will act as a line source and generate elastic (ultrasonic) surface waves having a generally plane wave front with constant amplitude and phase along lines parallel to each source over the surface of the glass. Maximum surface wave output occurs for a prism angle $\alpha$ such that the spatial period of the surface perturbations corresponds to the wavelength of the resultant surface waves at the frequency of the incident wave. That is when $C_L = C_S \sin \alpha$, where $C_L$ is the longitudinal wave velocity in the prism and $C_S$ is the surface wave velocity. For real values of $\alpha$, the prism material must be chosen such that $C_L < C_S$. One of the commonly available materials that meets this velocity requirement to generate surface waves on glass is an acrylic resin such as Plexiglas (trademark) or Lucite (trademark).

The transducers which act as sensors as well as radiators are connected in parallel for each array to pulse generating and receiving circuitry via lines 14 and **14*a* as shown in FIG. 1**. For some applications the elements may be connected sequentially or small groups of elements may be used.

FIG. 3 illustrates a complete position encoder wherein plate 10 has arrays **11*a*, 11*b* and 12*a*, 12*b*. Although only two arrays (as in FIG. 1) are required, it was found preferable in a model built and tested to add a second set of arrays at the opposite edges of the plate to increase sensitivity. These are positioned with respect to the first so that beams from opposite arrays are effectively interleaved. The arrays which are energized sequentially to avoid mutual interference are connected via leads 15 to the electronic circuitry required to energize the apparatus and process the echo signals received. This circuitry consists chiefly of a radiator driver 16, an electronic switch 17, and an echo receiver 18. The electronic switch is a diode gate switch with four-pole, double throw action which permits the four arrays to be multiplexed into a single driver and receiver and isolates the receiver during the driver pulse. The echo receiver consists of an RF amplifier 19, a demodulator 20, and a threshold detector 21. The amplifier gain is electronically swept during each scan to compensate for the signal attenuation with range by gain sweep 22. The output of the receiver goes to timing logic circuit which accomplishes echo timing by means of an oscillator 24, a gate 23, and a binary counter 30**. Both up and down counting are required to digitize scans originating at opposite sides of the input surface. The output of the counter passes to *x*-register 25 or *y*-register 26 as appropriate and thence to the computer. Control of the timing and other operations is maintained by signals from a control logic center 27.

The control circuitry allows two modes of operation, a continuous mode and a discrete mode. In the continuous mode a DATA READY pulse via line 28 signals the computer for every set of coordinates generated while stylus contact is maintained. In the discrete mode, only the location of the initial contact is transferred to the computer. The stylus must be lifted and repositioned to initiate another data transfer. The discrete mode considerably reduces the amount of data that must be handled without degrading the response time when the apparatus is being used for item selection or position reporting.

FIG. 4 shows the encoder plate positioned over typical educational question-and-response data 29. From this it will be appreciated that very close and intimate interaction can be achieved with this apparatus. Because pointing with the finger is a most natural reaction for humans especially children when faced with an instructional situation, the apparatus would have one of its most useful applications as part of a computer-aided teaching system. Although the apparatus would have prime usefulness in the educational field, it will also be useful in the broader more commercial areas such as purchasing, store inventory, library data retrieval, airport control, etc.

In the above description it has been assumed that in most cases the display tablet or sheet or glass or other suitable material would be flat. It should be pointed out that the surface being used does not have to be flat. A curved surface such as a CRT faceplate for example would be equally suitable.

What is claimed:

1. A touch-sensitive position encoder for computer input comprising:
   a. a sheet of a medium suitable for the propagation of elastic surface waves,
   b. a first transducer positioned at a first position at an edge of said sheet,
   c. a second transducer positioned at a second position at an edge of said sheet, said transducers being such as to act as radiators and sensors of elastic surface waves on said sheet,
   d. a pulsed source of energy connected to said transducers for generating surface waves on the sheet, and
   e. receiver and timing means connected to the transducers for detecting and timing reflected energy pulses such that the position of a human finger or other passive stylus placed on the sheet and causing reflections will be determined.

2. A touch-sensitive position encoder as in claim 1 wherein the medium is transparent.

3. A touch-sensitive position encoder as in claim 1 wherein the medium is a glass sheet.

4. A touch-sensitive position encoder for computer input comprising:
   a. a transparent sheet of a medium suitable for the propagation of elastic surface waves,
   b. a first linear transducer array positioned along one edge of said sheet,
   c. a second linear transducer array positioned along a second edge of said sheet at a predetermined angle to the first, said arrays being such as to act as radiators and sensors of elastic surface waves on said sheet,
   d. a pulsed source of energy connected to said arrays for generating surface waves on said sheet, and
   e. receiver and timing means connected to said arrays for detecting and timing reflected energy pulses such that the position of a human finger or other passive stylus placed on the sheet and causing reflections will be determined in geometric co-ordinate terms.

5. A touch-sensitive position encoder as in claim 4 wherein the first and second transducer arrays are positioned orthogonally and the position of the finger or stylus will be determined in *x–y* co-ordinate terms.

6. A touch-sensitive *x–y* position encoder as in claim 4 wherein the medium is glass.

7. A touch-sensitive position encoder as in claim 4 or claim 5 wherein third and fourth transducer arrays are positioned along the third and fourth edges of the transparent sheet and are connected to the pulsed source of energy and the receiver and timing means such that they operate in interleaved fashion with the said first and second arrays.

8. A touch-sensitive position encoder as in claim 1 or claim 4 wherein the pulsed source of energy and the receiver and timing means are connected to the said arrays in a timed, sequential fashion such that said receiver is isolated from the arrays during passage of the driver pulse from the pulsed source of energy.

9. A touch-sensitive *x–y* position encoder as in claim 4 or claim 5 wherein the pulsed source of energy and the receiver and timing means are connected to elements or sub-groups of said arrays in a timed, sequential fashion such that said receiver is isolated from said elements during passage of the driver pulse from the pulsed source of energy.

* * * * *